Dec. 17, 1968  W. L. DAHLGREN  3,416,257
ANIMAL TRAP
Filed June 2, 1967  2 Sheets-Sheet 1
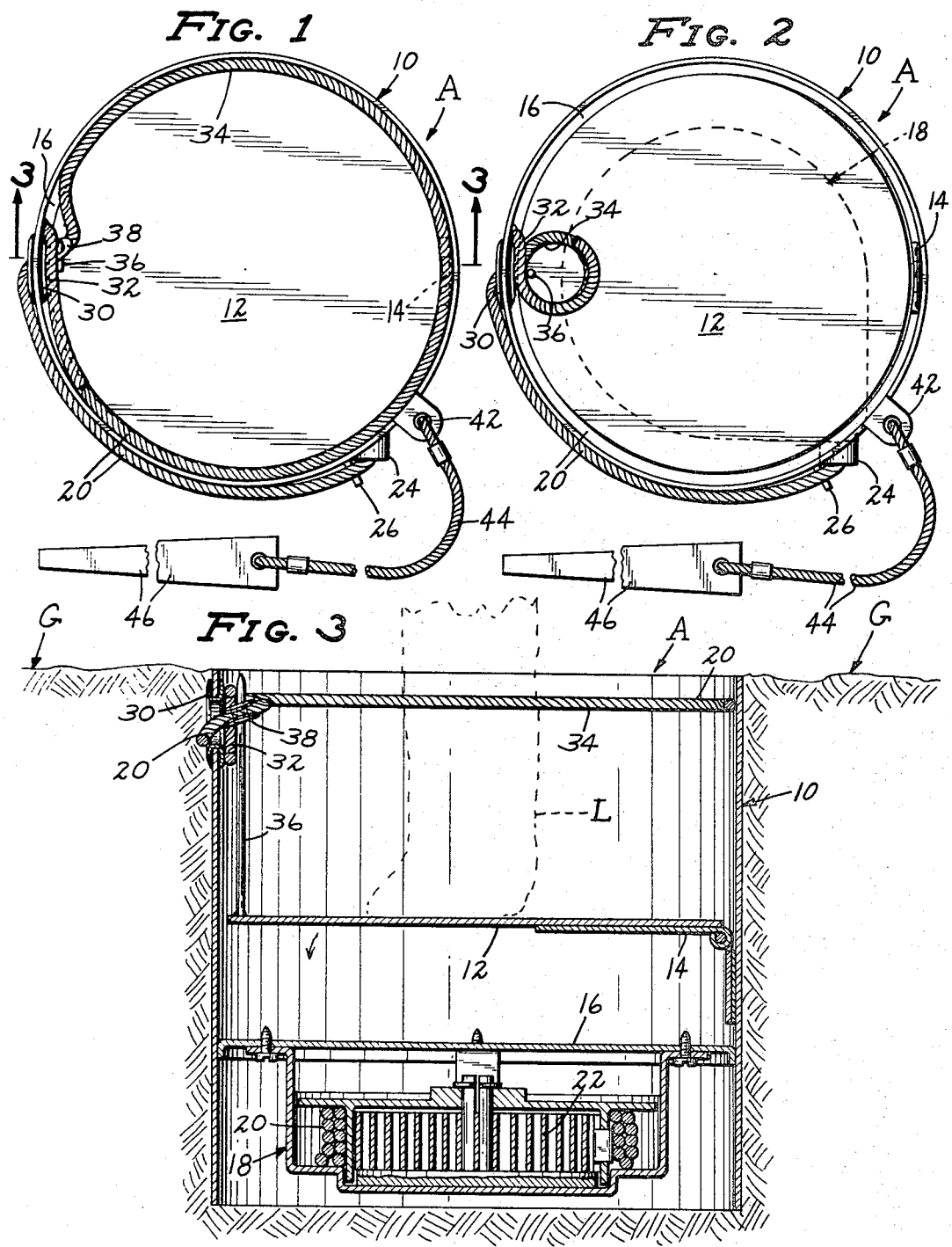
INVENTOR.
WALLACE L. DAHLGREN
BY
Caswell, Logaard & Hicks
ATTORNEYS

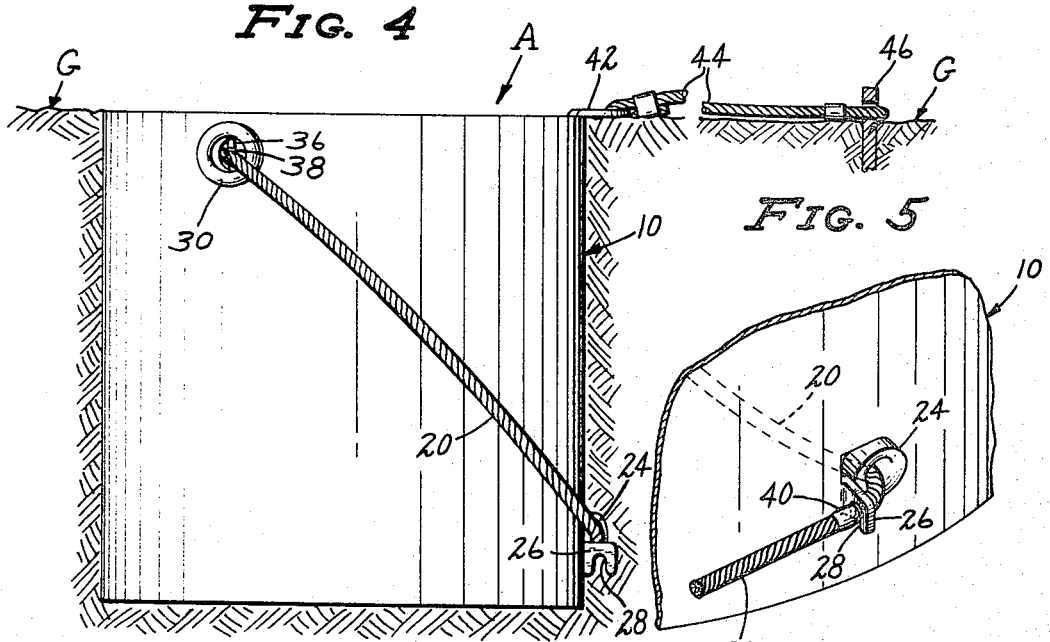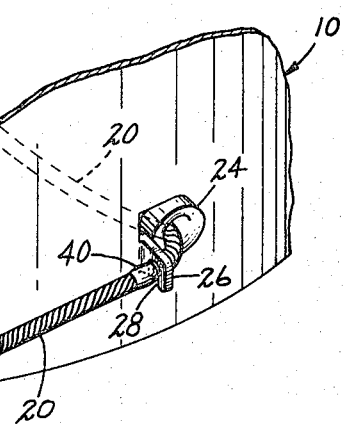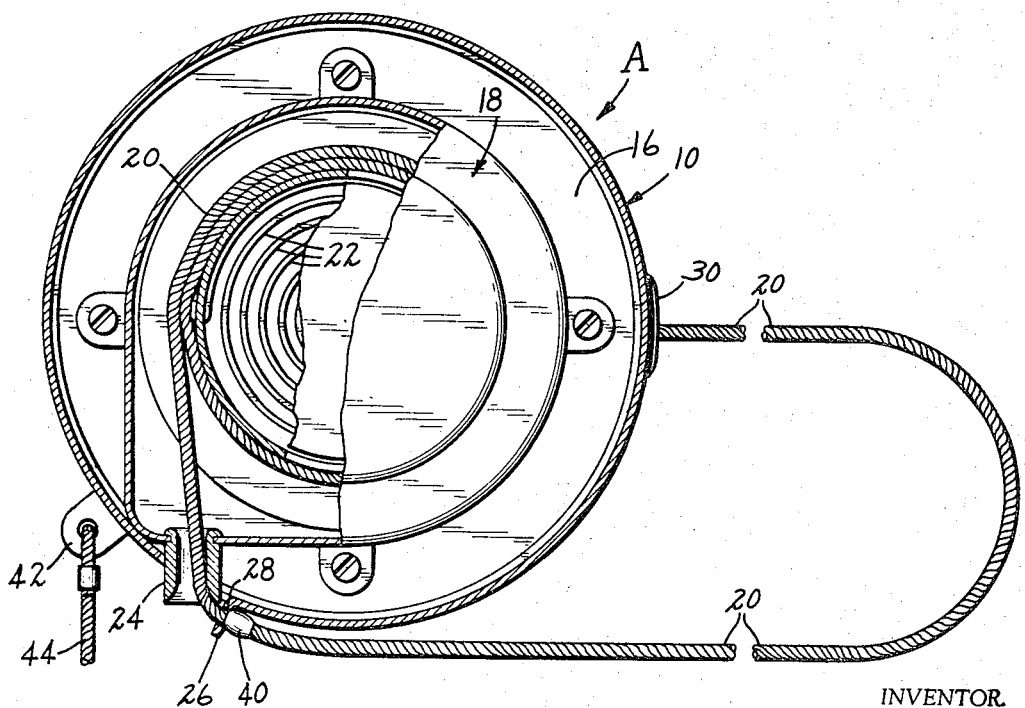

United States Patent Office 3,416,257
Patented Dec. 17, 1968

3,416,257
ANIMAL TRAP
Wallace L. Dahlgren, Rte. 4, Box 576,
Duluth, Minn. 55803
Filed June 2, 1967, Ser. No. 643,106
6 Claims. (Cl. 43—87)

ABSTRACT OF THE DISCLOSURE

The animal trap includes a base member in the form of a housing in which is mounted a movable trip member. The trip member has mounted thereon an extension in the form of a rod extending upwardly therefrom. A cable is provided which has a loop formed on the outer end thereof, and a cable take-up means is mounted on the housing. The cable is extended through the loop of the cable to form a noose with the inner end of the cable connected to the take-up means. The cable carries an eye through which the rod is extended to hold the cable in a noose formation within the housing against the action of the take-up means, the extension being withdrawn from the eye when the trip is moved which allows the cable take-up means to take up the cable and draw up the noose. Further provided is means for selectively holding the cable in an extended position against the action of the take-up means in the form of a bead on the cable which is engageable with a shoulder member carried by the housing.

Summary of the invention

The invention relates to animal traps and more particularly to a trap which is generally placed in a hole in the ground where it is felt an animal will step. It is an object of the invention to provide a housing in which a noose formed on a cable is positioned. It is a further object to provide a trip member movable within the housing and having an extension member which engages the cable thereby holding the noose in open condition so that when the trip member is depressed the extension member is withdrawn from engagement with the cable and the noose is drawn up by a cable take-up means mounted on the housing. It is an additional object to provide means for holding the cable in extended position whereby the noose may be formed and the extension member engaged with the cable thereby setting the trap. The means for holding the cable in extended position is then released.

The invention will appear more clearly from the following detailed description when taken in connection with the accompanying drawings, showing by way of example a preferred embodiment of the invention idea wherein like numerals refer to like parts throughout.

In the drawings forming part of this application:

FIGURE 1 is a top plan view of the trap in a set condition.

FIGURE 2 is a view similar to FIGURE 1 wherein the trap is shown in a tripped condition.

FIGURE 3 is a sectional view on the line 3—3 of FIGURE 1 showing the trap in a hole in the ground, with a portion of an animal's leg shown in broken lines.

FIGURE 4 is a side elevational of the trap in a hole in the ground.

FIGURE 5 is an enlarged detailed view of the cable holding means used in setting the trap, a portion of the housing being shown.

FIGURE 6 is a transverse section through the housing with portions of the cable take-up reel and trip plate broken away, the cable shown as held in an extended condition for setting the trap.

Referring to the drawings in detail, the trap A includes the base 10 in the form of a cylindrical housing open at the upper end and adapted to be placed in a hole formed in the ground G with the upper end of the housing substantially flush with the ground level. With the housing buried in the ground the same resists removal. Further provided is the trip plate 12 to which is secured the hinge 14 connected to the plate and to the wall of the housing. The numeral 16 designates a bottom support member secured inwardly of the housing 10 and spaced from the lower end thereof. Secured to the underside of the support 16 is the conventional cable supply and retrieval reel 18 on which is wound the cable 20 connected to and actuated by the coil spring 22 of the reel.

Also provided is the lower ferrule 24 which is secured to and extends through the wall of the housing 10 at a point allowing the cable to be drawn from the reel tangentially thereof. Secured to the housing 10 and adjacent the ferrule 24 is the flange 26 which extends radially of the housing 10. The flange 26 has formed on the under edge thereof the cable-receiving notch 28.

Further provided is the upper ferrule 30 which is mounted on and extends through the wall of the housing 10 adjacent the upper edge thereof. A small loop 32 is permanently formed on the outer end of the cable 20, and the cable is passed through the loop 32 thereby forming the noose 34. The cable 20 extends outwardly through the ferrule 30 and downwardly of the housing 10 to the lower ferrule where the cable is extended inwardly through the ferrule and to and upon the take-up retriever reel 18.

The numeral 36 designates an extension rod connected at its lower end to the trip plate 12 adjacent the edge of the trip plate and extending vertically upwardly therefrom to the upper edge of the housing 10. The cable 20 has secured thereto the eye member 38 spaced a distance from the small loop 32 whereby a noose having a diameter substantially of the inside of the housing is formed when the extension rod 36 is inserted in the eye, particularly FIGURE 1.

Also provided is the bead 40 secured upon the cable which provides a fixed shoulder on the cable for engagement with flange 26. The bead 40 is located on the cable at a point whereby the cable can be pulled out of the reel against the action of the spring 22 and the cable positioned in the notch 28 of the flange 26 with the bead 40 against the flange. The length of cable between the loop 32 and the flange 26 is sufficient to allow the easy formation of the noose 34 without the tension provided by the retriever reel 18, FIGURES 5 and 6. When the noose 34 is formed, and positioned within the housing as in FIGURE 1, the trip rod 36 is inserted in the eye 38 thereby holding the cable in the noose formation 34 due to the rod 36 urged against the small cable loop as a result of the tension on the cable created by the spacing 22 of the retriever reel. The cable is then removed from the notch 28 to the position of FIGURES 1, 2, 4, and 6. With the cable removed from the notch, the noose remain extended for the trip rod 36 bears against the cable loop 32. The trap is sprung by an animal inserting its leg L into the housing within the noose 34 and pressing downwardly upon the trip plate 12. As the trip plate is hingedly depressed downwardly the rod 36 is withdrawn from the eye 38 of the cable. As a result the cable is free to be pulled upon the reel thereby pulling up the noose 34 from the enlarged set position of FIGURE 1 to the small snare position of FIGURE 2 upon the leg of the animal. The noose 34 in its small condition, as shown in FIGURE 2, is held in this small gripping or snared condition by the resilient take-up of the reel 18.

Further provided is the anchor cable 44 secured to the lip 42 formed on the housing 10. The anchor cable 44 is secured to the anchor spike 46 which may be driven into the ground to further aid in the resistance to removal of the trap from a hole in the ground.

Having thus described the invention what is claimed as new and desired to be secured by Letters Patent is:
1. A trap for animals comprising;
   (a) a base,
   (b) a support mounted within said base,
   (c) a trip member movably connected to said base,
   (d) an extension formed on said trip member,
   (e) a cable member having a loop formed on the outer end thereof,
   (f) take-up means for said cable mounted on said support normally urging said cable to and upon the same,
   (g) said cable extended through said loop to form a noose and connected to said take-up means,
   (h) means carried by said cable for engagement with said extension of said trip member for holding the noose formed in an open trap position within said base against the action of said take-up means, said extension withdrawn from said extension engaging means of said cable when said trip member is moved thereby allowing said take-up means to take up said cable and draw up said noose, and
   (i) means for selectively holding said cable in an extended position against the action of said take-up means to allow engagement of said extension with said extension engaging means of said cable and the placement of the noose of the cable within the base.
2. The device of claim 1 in which
   (a) said base is a housing.
3. The device of claim 2 in which
   (a) said trip member is substantially circular in formation.
4. The device of claim 3 in which
   (a) said extension is a vertical rod member.
5. The device of claim 4 in which
   (a) said means carried by said cable for engagement with said rod member is an eye through which said rod member is extended.
6. The device of claim 5 in which
   (a) said means for selectively holding said cable in an extended position includes a bead formed on said cable, and
   (b) shoulder means connected to said housing for releasable engagement by said bead.

References Cited

UNITED STATES PATENTS

| | | | |
|---|---|---|---|
| 1,440,560 | 1/1923 | Sharp | 43—87 |
| 1,567,214 | 12/1925 | Van Tassel | 43—87 |
| 2,200,617 | 5/1940 | Clover | 43—87 |
| 2,478,025 | 8/1949 | Taylor | 43—87 |

WALTER H. CAMP, *Primary Examiner.*